March 29, 1927. 1,622,803
W. J. NOONAN
ELECTRICAL HEATING AND COOLING APPARATUS
Filed May 19, 1923 2 Sheets-Sheet 2
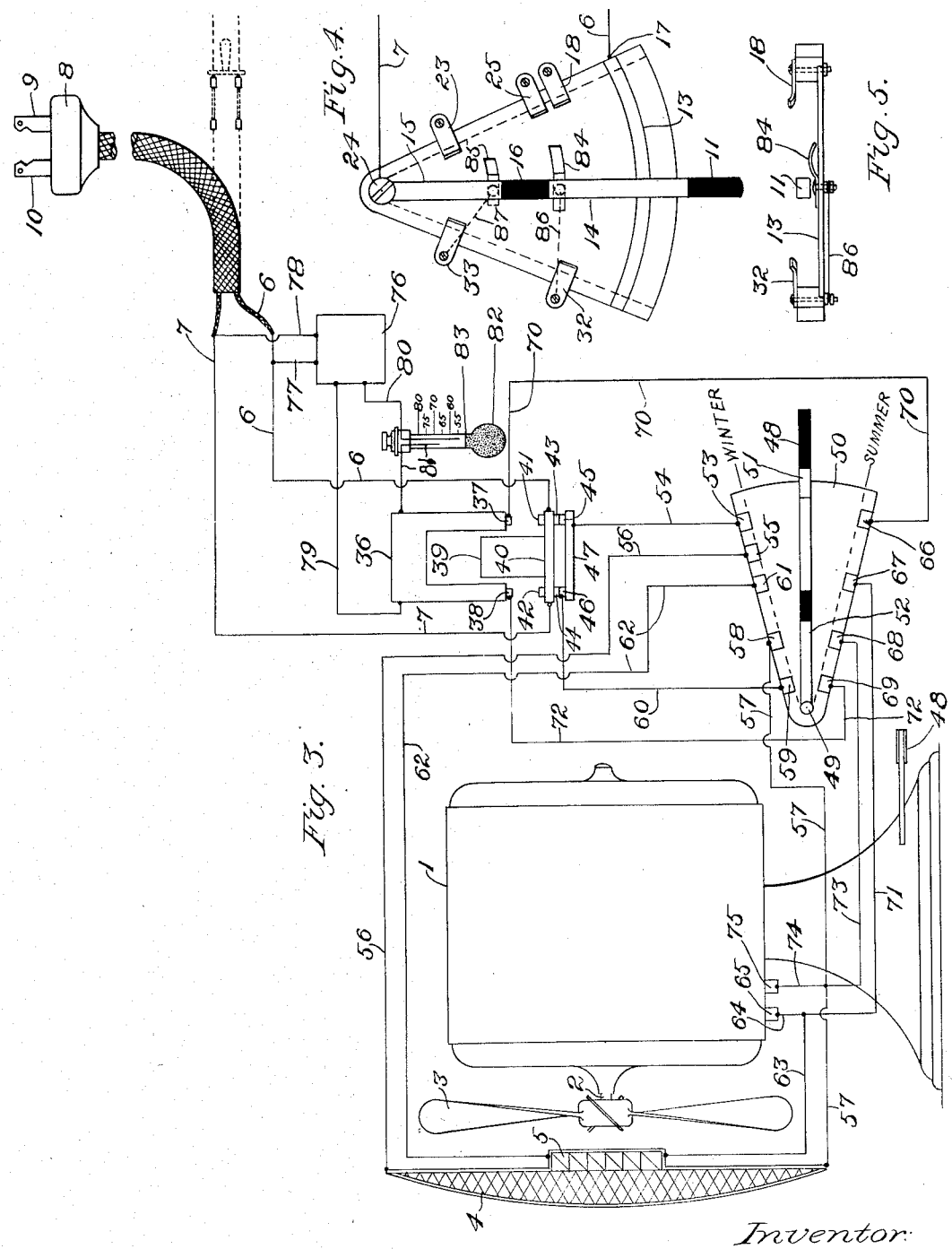
Inventor:
William J. Noonan
By Macleod, Calver, Copeland & Dike
Attorneys Patented Mar. 29, 1927.

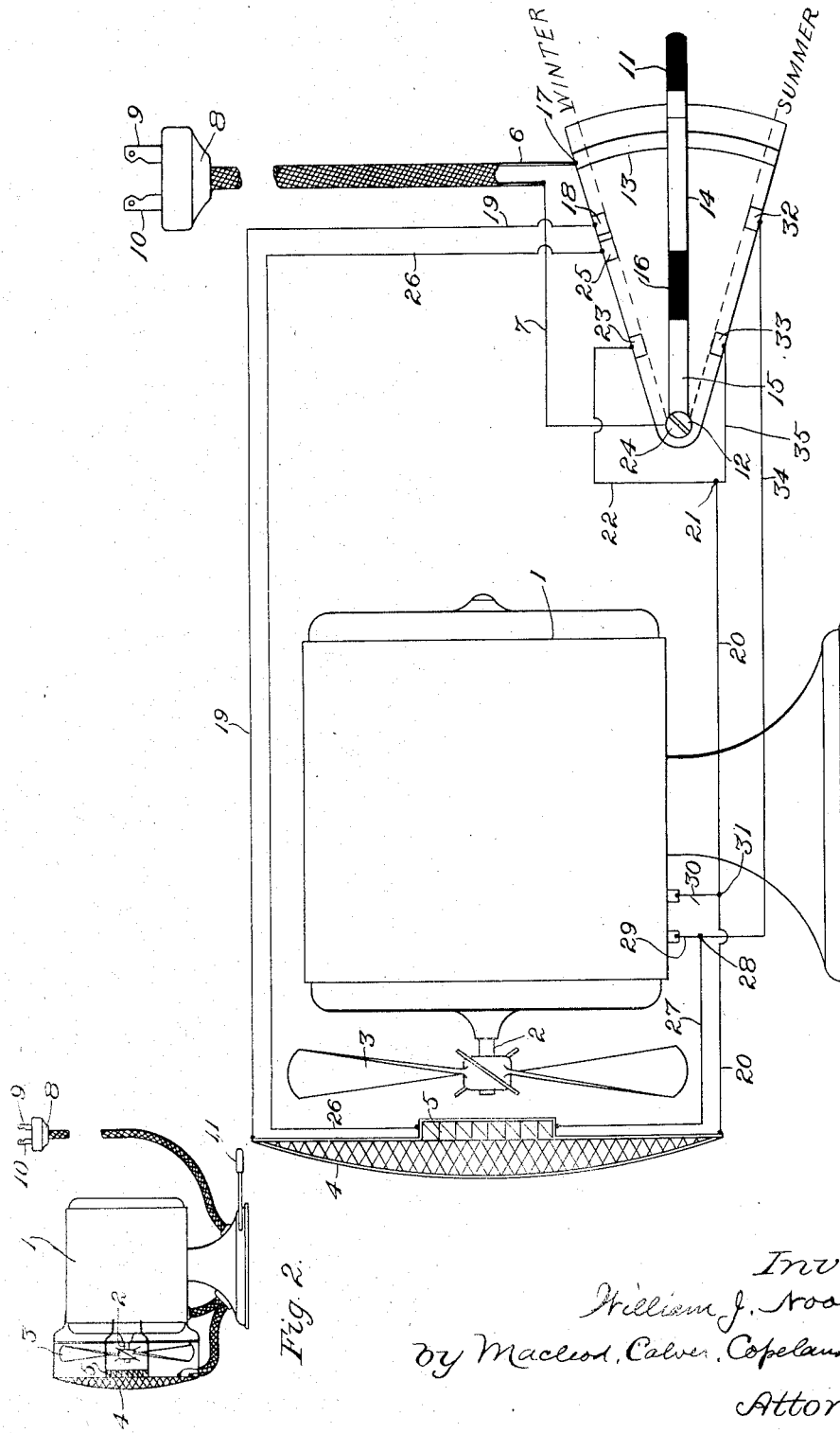

1,622,803

UNITED STATES PATENT OFFICE.

WILLIAM J. NOONAN, OF MANSFIELD, MASSACHUSETTS.

ELECTRICAL HEATING AND COOLING APPARATUS.

Application filed May 19, 1923. Serial No. 640,098.

The invention relates to an improvement in a heating and cooling apparatus. One object of the invention is to provide an electric heating and cooling system which may be controlled by one double-throw switch, preferably situated in the base of the motor, having an electric heating apparatus and having a fan to distribute the heat when the heating apparatus is in use, and to circulate the air when the heating apparatus is cut out during the warm weather. Another object of the invention is to automatically control the starting and stopping of both the heating apparatus and the fan when used for heating and to control the fan alone when used for cooling purposes only.

The apparatus is adapted to be connected up with the electric light wiring system of a house or other building. The connection for driving the motor and fan and heating element is especially intended for use in cool weather and the connection for cutting out the heating element and driving simply the motor and fan is especially intended for use during the warm weather. The motor and fan should be driven at slow speed when the heating element is in operation, as only a small volume of air is required to distribute the heat. When the heating element is cut out during warm weather, the motor and fan should be driven at a higher speed.

The invention will be fully understood from the following description when taken in connection with the accompanying drawings, and the novel features thereof will be pointed out and clearly defined in the claims at the close of this specification.

In the drawings:

Fig. 1 is a side elevation of one form of the apparatus embodying the invention, in which the switch is hand operated, the wiring being shown in diagram.

Fig. 2 is a side elevation on a somewhat smaller scale than Fig. 1, and showing the switch located in the motor base and the cables for the wires, the details being omitted.

Fig. 3 is a side elevation, partly in diagram, showing a thermostatic electrically controlled attachment.

Fig. 4 is a plan view showing means whereby the circuit may be first closed through the motor alone while the switch is being moved to close the circuit through the heating coil and resistance coil, in order that the motor may get a good start before it is subjected to the drag of the resistance coil.

Fig. 5 is a front end view of Fig. 4.

Referring to Figures 1 and 2, the invention will first be described as operated when it is desired to use both the heater and the fan for distributing the heat. In the drawings there is designated at 1 a motor having a rotary shaft 2 on which is mounted a fan 3. At 4 is represented a heating coil and at 5 a resistance coil in series with the motor, the heating coil being in proximity to the fan and formed with open work, in such manner that the hot air in the heating coil will be driven by the fan out into the room, creating an even temperature throughout the room. For convenience of description, one of the wires will be referred to as the positive wire and the other as the negative, although it is immaterial which is the positive and which is the negative.

At 6 is represented the positive wire of a circuit and at 7 the negative wire which are connected with the plug 8, having the two pins 9, 10 for connection with any suitable electric circuit, as for instance, by plugging it into the house circuit. At 11 is shown a switch lever pivoted at 12, the free end of said switch lever sliding on a contact bar 13. Said switch lever has contact portions 14 and 15 insulated from each other by a intermediate insulating portion 16. The positive wire 6 is connected with the contact bar 13 at 17.

At 18 is shown a contact piece with which is connected one end of a wire 19, which is adapted to be brought into electric connection with the positive wire 6 by means of the switch 11 when the said switch 11 is turned to bring the contact member 14 into contact with the contact member 18, which is preferably in the form of a clip.

Said wire 19 is electrically connected with the heating coil 4. Also connected with said coil 4 is a return wire 20 which at 21 is tapped onto a wire 22, said wire 22 being connected with a contact member 23.

When the switch is turned to bring the contact member 14 into contact with the member 18, the contact member 15 of the switch will at the same time be brought into contact with the member 23. In this position the contact member 23 and the contact member 15 of the switch will close the circuit from said wire 22, through the contact members 23 and 15 to the contact point 24, and back to the main negative wire 7, and the heating coil will be energized. The circuit will be from wire 6 to switch contact bar 13, switch lever contact member 14, contact 18, wire 19, heating coil 4, wires 20 and 22, contact 23, switch lever contact 15, point 24 and wire 7 to the plug.

A contact member 25 is so located as to make contact with the positive contact member of the switch 14 at the same time that the contact with the member 18 is made. A branch wire 26 leads from said contact member 25 to one end of the resistance coil 5, and at the other end of the resistance coil a wire 27 is connected at 28 with the wire 29 leading to the motor. The motor has a return wire 30 tapped into the wire 31, which thus leads back through the wire 20 and contact member 23, switch contact member 15 and point 24 to the negative wire 7, thus completing the circuit through the motor, whereby the fan is driven very slowly, producing a very small volume of air, sufficient only to put the heat produced by the main heating coil into circulation.

The complete circuit through the resistance coil and motor will be as follows: wire 6, contact bar 13, switch contact 14, contact 25, wire 26, resistance coil 5, wire 27, wire 29, to motor, out of motor by wire 30, wires 20, 22, contact 23, contact 15, point 24, wire 7 to the plug. The heating coil being thus energized and the fan being driven slowly, the hot air will be driven out by the fan through the meshes of the heating coil into the room.

If it is desired to shut off the heating coil and utilize the fan alone, as for instance, for warm weather use, there are provided contact clips 32 and 33 with which the contact portions 14 and 15, respectively, of the switch member will engage when the switch is thrown into proper position therefor. A wire 34 connects the contact member 32 with the wire 29 returning from the motor, and the member 33 is connected by a wire 35 with the wire 20 which at 31 is tapped onto the wire 30 leading to the motor. The circuit will now be from wire 6 through the contact bar 13, switch contact member 14, contact clip 32, wire 34 and wire 29 to the positive pole of the motor, and the negative wire 7 will be connected through the point 24, switch contact member 15, contact clip 33, wire 35, wire 20 and wire 30 to the negative pole of the motor. There will be no circuit through the heating coil or through the resistance coil.

By reason of there being no circuit through the resistance coil the motor and fan will be driven at a faster speed than when the resistance coil is in the circuit. The reason for omitting the circuit through the resistance coil when the heating coil is not in use, is because, in coooling the room in warm weather, more rapid circulation of the air is desired than when the heating coil is in use and the fan is used for distributing the hot air. Consequently a higher speed of the fan is required. The reason for having the fan run slower when the circuit is through the heating coil is to reduce the velocity of the air as it passes over the heater in order that the air may remain longer in contact with the heating coils and thereby be brought to a higher temperature before it is distributed by the fan.

The apparatus already described is more particularly intended for use in small buildings where a comparatively small amount of heat is required, and where it is desired to install a comparatively inexpensive heating system. It is also adapted for portable use in houses, for instance, for bath rooms, side chambers, etc. Preferably the switch is installed in the motor base, as shown in Figure 2.

The modified form of apparatus shown in Figure 3 is more particularly intended for larger buildings, where a greater amount of heat is required and where it is desired to have the apparatus work automatically and to require no personal attention from anyone to regulate the heat.

Referring to Figure 3, there is provided a motor 1, motor shaft 2, fan 3, heating coil 4, and resistance coil 5, as already described. At 6 and 7, respectively, are designated the positive and negative wires leading to the plug 8, also as heretofore described.

At 36 is shown a solenoid having the positive and negative contact points 37 and 38, respectively. At 39 is a movable core of the solenoid having an insulated crosshead 40 on which are mounted contact points 41 and 42, respectively, which are adapted to make contact with the points 37 and 38, and which also carry contact points 43 and 44 which are respectively adapted to make contact with the contact members 45 and 46 mounted on the contact carrier 47. The movable cross head and contact points carried thereby form a double circuit breaker.

Normally when the solenoid is not energized it will drop down so that the contact points 43 and 44, respectively, will be in engagement with the contact points 45 and 46. The positive wire 6 is connected with the electrical contact points 41 and 43, and the negative wire 7 is electrically connected with the two negative contact points 42 and 44.

The apparatus will first be described as used during cool weather, when it is desired to utilize the heating coil. A switch lever 48 is pivoted at 49 and is movable on its pivot so as to be shifted from one series of contact members to another series of contact members for the purpose which is hereinafter described. It carries contact members 51 and 52 which are insulated from each other. A fixed contact clip 53 is connected by a wire 54 with the contact point 45 on the contact carrier 47. There is also provided a stationary contact clip 55 with which the contact member 51 on the switch lever makes contact at the same time that it makes contact with the member 53. A wire 56 leads from the contact member 55 into one end of the heating coil 4. From the other end of the heating coil leads the wire 57, which is connected with a fixed contact member 58 with which the contact member 52 of the switch lever engages at the same time that the positive contact member 51 is in engagement with the positive member 53. There is also provided a fixed contact member 59 with which the negative contact member 52 of the switch lever engages when the switch is closed, and from said contact member 59 a wire 60 leads back to the negative contact member 46 on the contact carrier 47.

This makes a circuit through the heating coil, that is, the circuit through the heating coil is from wire 6 through contact point 43 on the circuit breaker, thence through the contact point 45, wire 54, contact member 53, switch contact 51, contact member 55, wire 56 to one end of the heating coil, thence through the wire 57, contact member 58, switch lever contact member 52, contact member 59, wire 60 to the negative contact member 46, thence to the negative contact member 44 connected with the solenoid core circuit breaker, thence back to the wire 7.

A contact member 61 is provided, with which the contact member 51 of the switch lever engages when the switch is closed. From said contact member 61 extends a wire 62 which enters one end of the resistance coil 5, and from the other end of the resistance coil runs a wire 63 which has a branch 64 entering the motor at 65. From the motor a negative wire 74 passes out at 75 and is tapped onto wire 57, which connects with contact point 58, as already described.

Thus when the switch is closed, the circuit through the resistance coil and motor is as follows: from the wire 6 through the contact member 43, contact member 45, wire 54, contact member 53, switch contact member 51, contact member 61, wire 62 to the resistance coil 5, thence through the wire 63 and wire 64 to the motor at 65, thence out of the motor at 75, through the wire 74, wire 57, contact block 58, switch lever contact member 52, contact member 59, wire 60, contact point 46 on the contact carrier 47, contact point 44, and wire 7, back to the plug 8.

The provision for warm weather or when it is not desired to use the heating coil is as follows: There are provided two contact members 66 and 67, with which the positive contact member 51 of the switch lever is adapted to engage, and two contact members 68 and 69 with which the negative contact member 52 of the switch lever is adapted to engage.

The contact member 66 is connected by a wire 70 with the contact point 37 of the solenoid, and the contact member 67 is connected by a wire 71 with the wire 64 leading to the motor. The negative contact member 69 is connected by a wire 72 with the negative pole 38 of the solenoid, and negative contact 68 is connected by a wire 73 and wire 74 with the motor at 75.

When the solenoid is energized, as will be hereinafter described, the core 39 will rise, causing the positive contact member 41 of the circuit breaker to engage with the positive contact member 37 of the solenoid, and causing the negative contact member 42 to engage with the negative contact member 38 of the solenoid, and the circuit through the motor will be as follows: wire 6 to contact member 41, thence to contact member 37, wire 70 and contact member 66, switch contact member 51, contact member 67, wire 71, wire 64 to the motor at 65, thence out at the point 75 through the negative wires 74 and 73, contact point 68, switch lever contact 52, contact point 69, wire 72, solenoid contact point 38, circuit breaker contact point 42, and wire 7 back to the main line. There is no circuit through the heating coil or resistance coil when the solenoid is energized.

In order to energize the solenoid, provision is made for connecting up the solenoid with the wires 6, 7. Preferably the current is reduced before entering the solenoid, and to this end there is provided a transformer 76 into which branch wires 77 and 78 lead respectively from the positive and negative wires 6 and 7. A positive wire 79 and a negative wire 80, respectively lead from the transformer and connect with the solenoid, the wire 80 preferably making the connection through a thermostatic make-and-break 82 and wire 81.

Preferably the circuit through the solenoid is thermostatically controlled, so that if in summer the temperature falls below a certain predetermined point, the circuit will be broken and the motor and fan stopped. If the circuit through the solenoid is broken, then it will be de-energized and the motor stopped. To this end a mercury contact thermostat 82 is provided, which preferably has a mercury contact 83. The wire 80 extends down into the tube far enough to always dip into the mercury within any reasonable variations of temperature. The wire 81 also extends down into the tube, but only just far enough to contact with the mercury when the temperature rises to a predetermined degree, so that the mercury rises sufficiently to contact with the lower end of said wire 81. When both wires are in contact with the mercury they will be in electrical connection and the circuit through the solenoid will be closed, so that it will be energized and the member 40 will rise so that the contact points 41 and 42, respectively, will engage with the contact points 37 and 38, and the circuit will be closed through the motor, as previously described, and start the fan. As shown in the drawings, the short wire 81 is adjusted so that the contact will be made when the temperature rises to about 67°.

Preferably means are provided for adjusting the wire 81, so that it will extend a greater or less distance down into the mercury to regulate the point, according to the temperature desired, at which the fan will begin to operate.

The thermostatic regulation in cold weather, that is, when the switch lever is thrown into the position indicated in the drawings as for winter use so as to utilize the heating coil, is as follows.

As already stated, the normal position of the circuit breaker is for the solenoid to be in drop position with the contact members 43 and 44 in contact with the contact points 45 and 46, so as to close the circuit through the heating coil. The purpose of the thermostatic control in cool weather, therefore, is to automatically break the circuit when the temperature rises above a certain point, so as to shut off the heat. When the temperature is below the predetermined point so that the mercury contact in the thermostat is broken, the solenoid will be de-energized, and the circuit through the heating coil will be closed, and the heat will be on. When the temperature rises, and therefore the mercury rises sufficiently to make the contact between the wires 80 and 81, the solenoid will be energized and the core 38 will rise and break the contact of the points 43 and 44 with the points 45 and 46, thus breaking the circuit through the heating coil and shutting off the heat. When the temperature falls below the predetermined point, the solenoid will be de-energized and the circuit breaker will drop so that the points 43 and 44 will again contact with the points 45 and 46, thereby closing the circuit through the heating coil and start the heat again.

When the apparatus is one of the larger sizes for use in heating a comparatively large space and the ordinary house current is used, the current may not be sufficient to start the motor when the switch is set for winter use on account of the current passing through the resistance coil, which is in series with the motor, although the current may be sufficient to maintain the motor running at the required slow speed after it is once started. I have found that in such case, if the circuit is first made through the motor alone and not through the heater and resistance coil, the current will be sufficient to start the motor, and then the switch may be set to the winter position so as to close the circuit through the heating coil and resistance coil, and the motor having been started will easily be kept going. One way of accomplishing this is to first throw the switch into the position described as the summer position, so as to make contact with the members 32 and 33 in the form shown in Figure 1, which will start the motor, and then to move the switch over to the winter position, making contact with the members 18, 25 and 23, as shown in Figure 1, closing the circuit through the resistance coil and the heater as well as through the motor. This requires a double movement of the switch, that is, first moving it in one direction and then in the other. I have, therefore, provided a more simple method by which the result can be accomplished by moving the switch only in one direction. Means for accomplishing this are shown in Figures 4 and 5. The means provided are as follows:

Two contact members 84 and 85 are located in position where they will be engaged by the contact portions 14 and 15, respectively, of the switch lever during the movement of the switch lever from the neutral position shown in Figure 1 to make contact with the members 18, 25 and 23, in setting the switch for the winter position. The contact member 84 has electrical connection, by a wire 86 with the contact member 32 on the summer side, and the contact member 85 is electrically connected by a wire 87 with the contact member 33 on the summer side. When the contact portions 14, 15 of the switch lever engage with the contact members 84 and 85, during the movement of the switch member into the winter position, it will temporarily close the summer circuit through the contact members 32, 33 just the same as if the switch members had been moved directly into contact with the members 32, 33. The temporary contact made by slowly sliding the switch lever over the members 84, 85 will be sufficient to start the motor, and the switch lever may be continued on in its movement to the winter position.

What I claim is:

1. In a device of the character described, an electric motor, an electric heater, a fan driven by said motor, a resistance member in series with the motor, an electric circuit through the motor, a shunt circuit through the heater, a shunt circuit through the motor and resistance, a switch lever included in said circuit and having two contact portions insulated from each other, two sets of fixed contact members, one set of said fixed contact members having three so located that the switch lever may be adjusted to close the circuit through the motor, heater and resistance, the other set of fixed contact members having two members so located that the lever may be adjusted to close the circuit through the motor alone.

2. In a device of the character described, an electric circuit, a motor within said circuit, a fan driven by said motor, a shunt circuit having a heating coil therein, a plurality of stationary contact members for winter use, a switch carrying a plurality of contact portions which is adapted to be moved at will so as to bring all of said contact portions respectively into engagement with the said stationary contact members and a thermostatically controlled make and break device, independent of said switch, which is normally closed when the temperature is below a predetermined point and whereby when the temperature rises above a said predetermined point, the circuit through the motor and heating coil will be broken and when the temperature again falls below said predetermined point, the circuit will be closed through both the motor and heating coil.

3. In a device of the character described, an electric circuit, a motor within said circuit, a fan driven by said motor, a shunt circuit having a heating coil therein, a plurality of stationary contact members for winter use, a switch carrying a plurality of contact portions which is adapted to be moved at will so as to bring all of said contact portions respectively into engagement with the said stationary contact members, a thermostatically controlled make and break device, independent of said switch, which is normally closed when the temperature is below a predetermined point and whereby when the temperature again rises above said predetermined point, the circuit through the motor and heating coil will be broken and when the temperature again falls below said predetermined point, the circuit will be closed through both the motor and heating coil, and a second set of stationary contact members for summer use with which the contact members of the lever may be brought into engagement to close the circuit through the motor alone without closing the circuit through the heater, said thermostatically controlled make and break device being adapted to close the circuit through the motor and thereby start the fan when the temperature rises above said predetermined point and which is adapted to break the circuit through the motor and thereby stop the fan when the temperature falls below said predetermined temperature.

4. In a device of the character described, an electric circuit, a motor within said circuit, a fan driven by said motor, a shunt circuit having a heating coil therein, a manually controlled switch which is adapted to be moved to close the circuit through both the motor and heating coil and which may also be manually moved in another direction to close the circuit through the motor alone without closing the circuit through the heater, a solenoid having a core carrying contact members which form a make and break in a different portion of the circuit from that controlled by the manually operated switch, a thermostatic make and break device in circuit with the solenoid which is closed when the temperature rises above a predetermined point and thereby energizes the solenoid and breaks the circuit through the motor and heater, and which when the temperature falls below said predetermined point breaks the circuit through the solenoid and means whereby when the solenoid is de-energized the circuit through the motor and heater will be closed again.

5. In a device of the character described, an electric circuit, a motor within said circuit, a fan driven by said motor, a shunt circuit having a heating coil therein, a manually controlled switch which is adapted to be moved to close the circuit through both the motor and heating coil and which may also be manually moved in another direction to close the circuit through the motor alone without closing the circuit through the heater, a solenoid having a core carrying contact members which form a make and break in a different portion of the circuit from that controlled by the manually operated switch, a thermostatic make and break in circuit with the solenoid which is closed when the temperature rises above a predetermined point and thereby energizes the solenoid and which when the temperature falls below said predetermined point breaks the circuit through the solenoid, two sets of stationary contact members with which said manually controlled switch is adapted to engage when set in different positions in one of which it is adapted to close the circuit through the motor and heater when the solenoid is de-energized and in the other of which it is adapted to close the circuit through the motor alone when the solenoid is energized, the energizing of the solenoid when said manually controlled switch is in engagement with one set of said stationary contacts being operative to break the circuit through the motor and heater and the energizing of said solenoid when the said manually controlled switch is in engagement with the other set of stationary contacts being operative to close the circuit through the motor.

6. In a device of the character described, an electric heater, an electric motor, a fan driven by said motor, an electric circuit, a switch lever included within said circuit, means whereby when said switch is adjusted in a certain position, if the temperature falls below a certain predetermined point, the circuit will be closed through the motor and heater, and if the temperature rises above a certain predetermined point, the circuit will be broken through the heater and motor, and when said switch is moved into a certain other predetermined position the circuit will be at all times broken through the heater and the circuit will also be broken through the motor if the temperature falls below a certain predetermined point and will be closed through the motor when the temperature rises above a certain predetermined point.

In testimony whereof I affix my signature.

WILLIAM J. NOONAN.